United States Patent
Klosterman et al.

(10) Patent No.: US 6,801,330 B1
(45) Date of Patent: Oct. 5, 2004

(54) SELECTING A PAGE DESCRIPTION LANGUAGE FOR A PRINTER DRIVER

(75) Inventors: Elliot Lee Klosterman, Boise, ID (US); Dennis W. Howard, Eagle, ID (US); James A. Hill, Garden City, ID (US); Brian D. Griebe, Star, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 933 days.

(21) Appl. No.: 09/652,610

(22) Filed: Aug. 30, 2000

(51) Int. Cl.[7] .......................... G06K 15/00; G06F 15/00
(52) U.S. Cl. ..................................... 358/1.13; 358/1.15
(58) Field of Search ................ 358/1.1–1.9, 1.11–1.18; 719/321–327, 328, 329

(56) References Cited

U.S. PATENT DOCUMENTS

| | | | |
|---|---|---|---|
| 6,246,486 B1 | * 6/2001 | Takahashi | 358/1.13 |
| 6,493,099 B2 | * 12/2002 | Nakagiri | 358/1.13 |
| 6,567,180 B1 | * 5/2003 | Kageyama et al. | 358/1.15 |
| 6,714,964 B1 | * 3/2004 | Stewart et al. | 709/203 |

* cited by examiner

Primary Examiner—King Y. Poon

(57) ABSTRACT

A page description language (PDL) is selected for use by a device driver. A PDL is assigned to an application. The assignment of the PDL to the application may then be stored to an index such as a registry or to a file. The device driver is loaded from within the application. The application, from within which the device driver was loaded, is discovered. The application from within which the device driver was loaded may be discovered by examining the host operating environment upon which the application is operating. The PDL assigned to the application is selected for use by the device driver. The PDL assigned to the application may be selected by searching the index to find the PDL assignment for the application and extracting from the assignment the PDL assigned to the application.

17 Claims, 2 Drawing Sheets

SELECTING A PAGE DESCRIPTION LANGUAGE FOR A PRINTER DRIVER

FIELD OF THE INVENTION

This invention relates in general to device drivers and, more particularly, to a device driver selecting a page description language for use.

BACKGROUND OF THE INVENTION

A page description language (PDL) is a language for describing the layout and contents of a printed page. Printer drivers are interfaces between applications and printers. Printer drivers receive information from applications and translate the information into PDLs. The printer drivers then communicate with the printers using the PDLs.

Conventionally, a printer capable of understanding multiple PDLs required multiple printer drivers to interface with applications. Each printer driver would translate information from applications to only one PDL. Therefore, in order to utilize each PDL of a printer, a printer driver was required for each PDL.

User applications are often tailored to or simply work best with a particular PDL. Prior solutions for selecting a PDL for use with an application required that a user select the driver that implements the desired PDL. In many cases, the user may not have known what a PDL was or which PDL should be used with an application.

SUMMARY OF THE INVENTION

According to principles of the present invention, a page description language (PDL) is selected for use by a device driver. A PDL is assigned to an application. The device driver is loaded from within the application. The application from within which the device driver was loaded is discovered. The PDL assigned to the application is selected for use by the device driver.

According to further principles of the present invention, the application from within which the device driver was loaded may be discovered by examining the host operating environment within which the application is operating.

According to further principles of the present invention, the assignment of the PDL to the application may be stored in an index such as a registry or a file.

According to further principles of the present invention, the PDL assigned to the application may be selected by searching the index to find the PDL assignment for the application and extracting from the assignment the PDL assigned to the application.

DETAILED DESCRIPTION OF THE INVENTION

Figure 1:
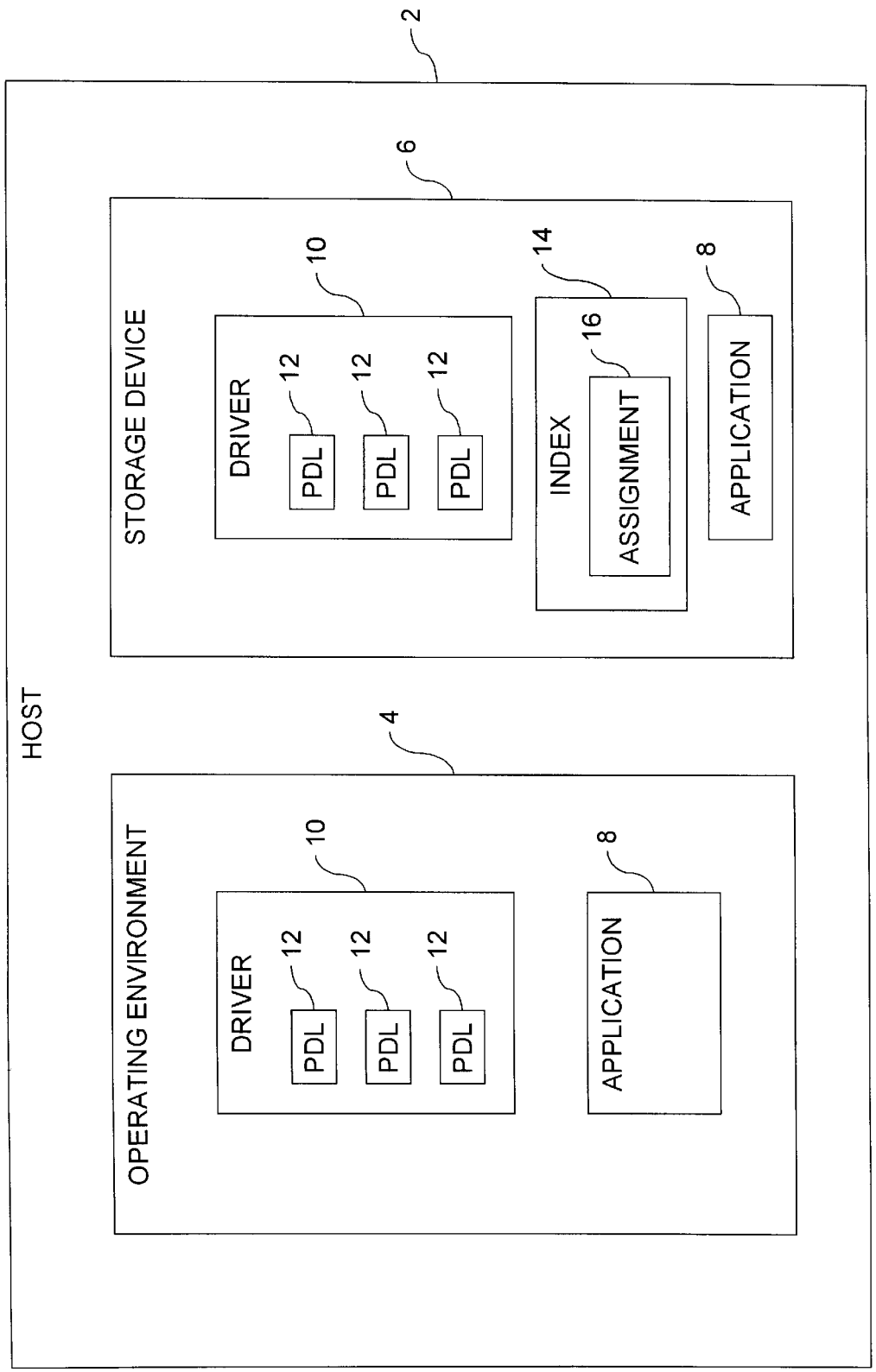
FIG. 1 is a block diagram representing one embodiment of the system of the present invention for selecting a page description language for use by a device driver.

Illustrated in FIG. 1 is a host system 2, having an operating environment 4 and a storage device 6. Host 2 is any system, such as a specific or general purpose computer, that includes a means for processing executable code and provides an operating environment 4 for applications 8. Operating environment 4 is any environment within which applications 8 may run. Application 8 is any user application that uses device drivers 10 for interfacing with devices (not shown). Device drivers 10 are executable code for interfacing between applications 8 and devices. Device drivers 10 translate information from application 8 to at least one page description language (PDL) 12.

Storage device 6 is any device for storing data or executable code. The present invention does not require storage device 6. Storage device 6 may be any type of storage media such as magnetic, optical, or electronic storage media. Stored within storage device 6 may be application 8, device driver 10, and index 14. Index 14 is any type of index such as a registry or file. Stored within Index 14 is at least one assignment 16 of a PDL 12 to an application 8.

Figure 2:
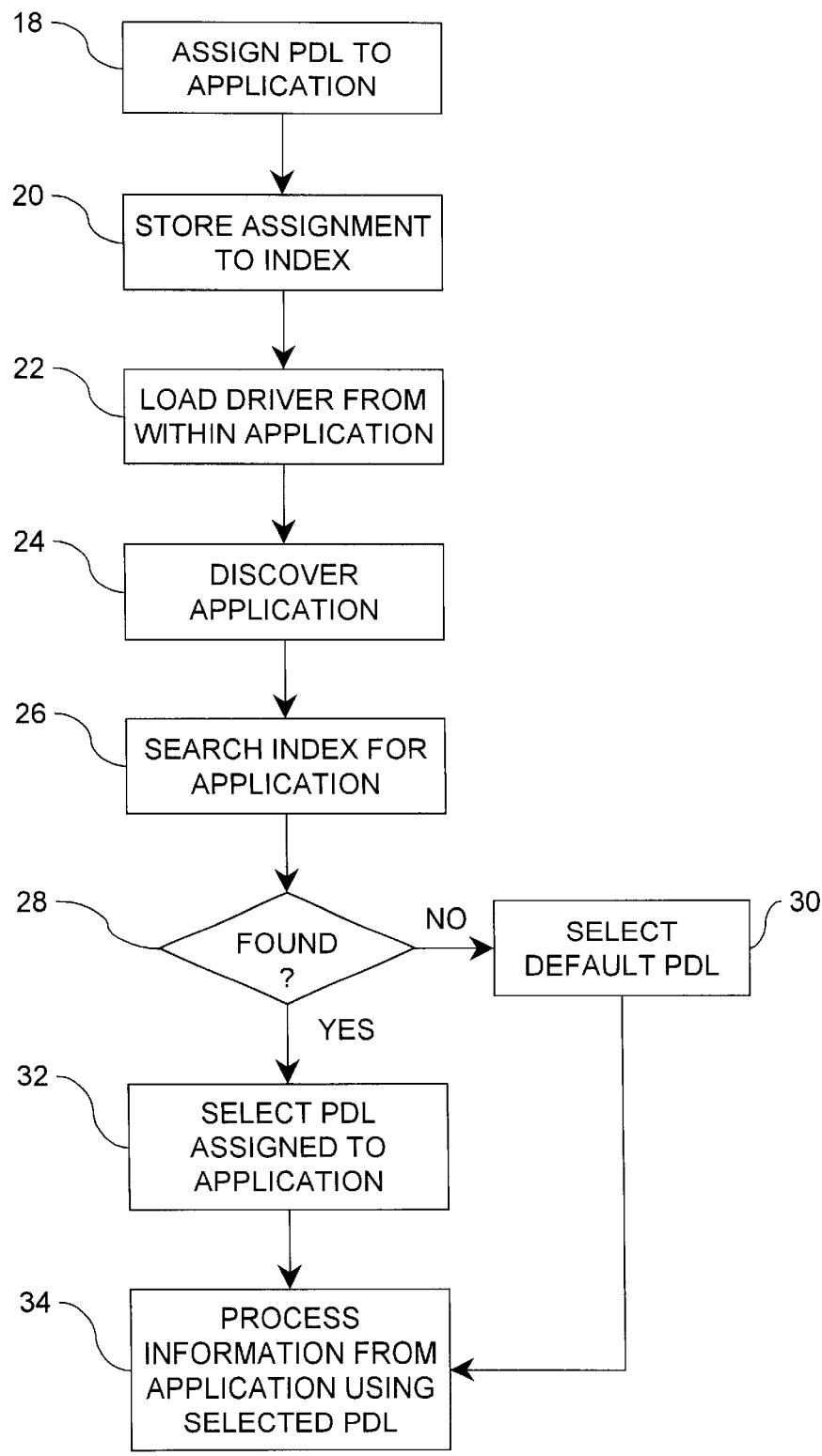
FIG. 2 is a flow chart illustrating one embodiment of the method of the present invention for selecting a page description language for use by a device driver.

Illustrated in FIG. 2 are steps for practicing a method of the present invention. A PDL 12 is assigned to an application 8 to create an assignment 16. Assignment 16 is stored 20 to index 14. Application 8 loads 22 driver 10. Operating environment 4 is examined to discover 24 which application 8 loaded driver 10. Alternatively, some other method is used to discover 24 which application 8 loaded 22 driver 10. Application 8 is either discovered 24 by device driver 10 or, alternatively, by some other element.

Next, PDL 12 assigned to application 8 is selected for use by device driver 10. In one embodiment, index 14 is searched 26 for assignment 16 for application 8. If no assignment 16 is found 28 in index 14 for application 8, a default PDL 12 is selected 30. If assignment 16 is found 28 in index 14, the PDL 12 assigned to application 8 is selected 32. Executable code for carrying out the selection process may be embodied within device driver 10 or, alternatively, within some other element. Driver 10 uses 34 the PDL 12 assigned to application 8 to process information from application 8.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A method for selecting a page description language (PDL) for use by a device driver, the method comprising:
   (a) assigning a PDL to an application;
   (b) loading the device driver from within the application;
   (c) discovering the application within which the device driver was loaded; and,
   (d) selecting, for use by the device driver, the PDL assigned to the application.

2. The method of claim 1 wherein discovering the application from within which the device driver was loaded includes examining a host operating environment to discover the application from within which the device driver was loaded.

3. The method of claim 1 wherein discovering the application from within which the device driver was loaded includes the device driver discovering the application from within which the device driver was loaded.

4. The method of claim 1 wherein selecting the PDL assigned to the application includes the device driver selecting the PDL assigned to the application.

5. The method of claim 1 further including storing to an index the assignment of the PDL to the application.

6. The method of claim 5 wherein selecting the PDL assigned to the application includes:
   (a) searching the index to find the PDL assignment for the application; and,
   (b) extracting from the assignment the PDL assigned to the application.

7. A system for selecting a page description language (PDL) for use by a device driver, the system comprising:
   (a) means for assigning a PDL to the application;
   (b) means for loading the device driver from within the application;
   (c) means for discovering the application within which the device driver was loaded; and,
   (d) means for selecting, for use by the device driver, the PDL assigned to the application.

8. The system of claim 7 further including a host operating environment upon which the application operates and wherein the means for discovering the application from within which the device driver was loaded includes means for examining the host operating environment to discover the application from within which the device driver was loaded.

9. The system of claim 7 wherein the means for discovering the application from within which the device driver was loaded includes device driver means for discovering the application from within which the device driver was loaded.

10. The system of claim 7 wherein the means for selecting the PDL assigned to the application includes device driver means for selecting the PDL assigned to the application.

11. The system of claim 7 further including:
    (a) an index; and,
    (b) means for storing to the index the assignment of the PDL to the application.

12. The system of claim 11 wherein the means for selecting the PDL assigned to the application includes:
    (a) means for searching the index to find the PDL assignment for the application; and,
    (b) means for extracting from the assignment the PDL assigned to the application.

13. A program storage device readable by a computer, tangibly embodying a program, applet, or instructions executable by the computer for selecting a page description language (PDL) for use by a device driver, the instructions when executed cause a computer to perform the following method steps:
    (a) assigning a PDL to the application;
    (b) loading the device driver from within the application;
    (c) discovering the application within which the device driver was loaded; and,
    (d) selecting, for use by the device driver, the PDL assigned to the application.

14. The program storage device of claim 13 wherein the method step of discovering the application from within which the device driver was loaded includes examining a host operating environment to discover the application from within which the device driver was loaded.

15. The program storage device of claim 13 wherein the step of selecting the PDL assigned to the application includes the device driver selecting the PDL assigned to the application.

16. The program storage device of claim 13 wherein the method steps further include storing to an index the assignment of the PDL to the application.

17. The program storage device of claim 13 wherein the method step of selecting the PDL assigned to the application includes:
    (a) searching the index to find the PDL assignment for the application; and,
    (b) extracting from the assignment the PDL assigned to the application.

* * * * *